United States Patent [19]

Heidenreich et al.

[11] 3,885,076

[45] May 20, 1975

[54] ELECTRON BEAM GENERATED PATTERNS OF METAL-CONTAINING POLYMERS

[75] Inventors: Robert Darrow Heidenreich, Warren Township, Somerset County; Larry Flack Thompson, Gillette, both of N.J.

[73] Assignee: Bell Telephone Laboratories, Incorporated, Murray Hill, N.J.

[22] Filed: May 9, 1973

[21] Appl. No.: 358,731

[52] U.S. Cl. ............................... 428/195; 427/43

[51] Int. Cl. ........................... B44d 1/18; B05c 5/00

[58] Field of Search. 117/212, 93.3, 93.31, 161 UZ; 204/168

[56] References Cited

UNITED STATES PATENTS 3,318,790 5/1967 Carbojal et al. .................... 204/168

*Primary Examiner*—John D. Welsh

*Attorney, Agent, or Firm*—A. N. Friedman; G. S. Indig; E. M. Fink

[57] ABSTRACT

A patterned deposit of a metal-containing organic material is produced on a substrate by an electron beam cross-linking process. The starting material contains ferrocene (di-$\pi$-cyclopentadienyl iron) or organic groups of the class of ferrocene, where Ni, Co, V, Cr and Ti can be included in place of iron. The electron beam is directed against either a film adsorbed on the substrate from the vapor phase or a polymer film deposited on the substrate from a solution of a polymer with ferrocene substituents. The cross-linked product film can be used, for example, as a high resolution mask for semiconductor and microcircuit processing. The heavy metal content of the film makes it useful as an ion implantation mask and for nucleation of the electroless deposition of an additional metallic layer for direct generation of a conductor pattern.

7 Claims, 6 Drawing Figures

ELECTRON BEAM GENERATED PATTERNS OF METAL-CONTAINING POLYMERS

BACKGROUND OF THE INVENTION

1. Field of the Invention

The invention lies in the field of the production of patterned thin film layers.

2. Description of the Prior Art

A great deal of interest has focused recently on the use of electron beams in the production of high resolution masking films for semiconductor and microcircuit processing. A number of polymeric materials such as epoxidized polybutadiene have been found to be useful as electron beam resists in many common processing techniques in which masking is used (T. Harai et al, *Journal of Electrochemical Society*, 118 (1971)669). For many uses these materials are quite suitable. However, for example, for ion implanatation masking, improved contrast could be realized if materials of greater stopping power for a given layer thickness can be found. Another area of interest in the field of patterned thin film layers is the direct generation of patterned thin films of metals (M.A. De Angelo et al., U.S. Pat. No. 3,562,005, issued Feb. 9, 1971). The production, for example, of conductive paths on microcircuits and of images for memory or display purposes is contemplated.

SUMMARY OF THE INVENTION

It has been found that metal-containing organic compounds of the structure of ferrocene (di-$\pi$-cyclopentadienyl iron) are useful in the production of electron beam generated patterned layers for ion implantation masking and in the pattern production step of the nucleation of electrolessly deposited metal patterns, as well as for the more common etch and deposition masking uses. The class of useful materials included in place of all/or/part of the iron in ferrocene are the metals, Ni, Co, V, Cr, and Ti. These "ferrocene" materials can be cross-linked on a substrate after being absorbed from the vapor phase in the electron beam chamber. Alternatively, the iron containing member of the class (ferrocene) can be reacted with polymerizable organic groups such as the vinyl group or the vinyl diphenyl group. These materials can be deposited from the vapor phase or polymerized in bulk and the resulting polymer, deposited (e.g. from solution) as a film on the surface of the substrate to be processed. An electron beam directed against a selected portion of the deposited film produces cross-linking in that portion, rendering that portion insoluble. The uncrossed-linked portion of the film can then be removed leaving the desired patterned film.

The metal content of such electron beam generated patterned films makes these films denser than equivalent non-metal-containing polymer films. This increased density increased density makes these films especially useful as ion implantation masks. Another use for which these films are particularly suited is as a first step in the direct generation of conductor patterns on the surface of the substrate by the electroless deposition of additional metal on those portions of the surface selected by the electron beam.

DETAILED DESCRIPTION OF THE INVENTION

The Materials

Ferrocene (di-$\pi$-cylopentadienyl iron) is a molecule consisting of an iron atom sandwiched ($\pi$ - bonded) between two five carbon ring groups. This is the most stable member of a class of compounds in which a metal atom is sandwiched between two five member hydrocarbon ring groups. Such compounds containing iron, nickle, cobalt, vanadium, chromium and titanium have been formed (Cotton and Wilkinson, *Advanced Inorganic Chemistry*, Interscience Publishers, (1962), pages 638 through 660, see especially 644 ff.). In addition to being more stable in an oxygen atmosphere, relative to the other members of the group, ferrocene is also stable to the chemical reactions necessary for its combination with unsaturated organic groups capable of forming chain polymers. Ferrocene has been combined with such groups as vinyl, acryloyl and vinyl-diphenyl forming monomers (Arimato and Haven, *Journal of American Chemical Society*, 77 (1955) 6295 and Aso et al., Die Makromolekulare Chemie, 124, (1969)232).

Figure 1:
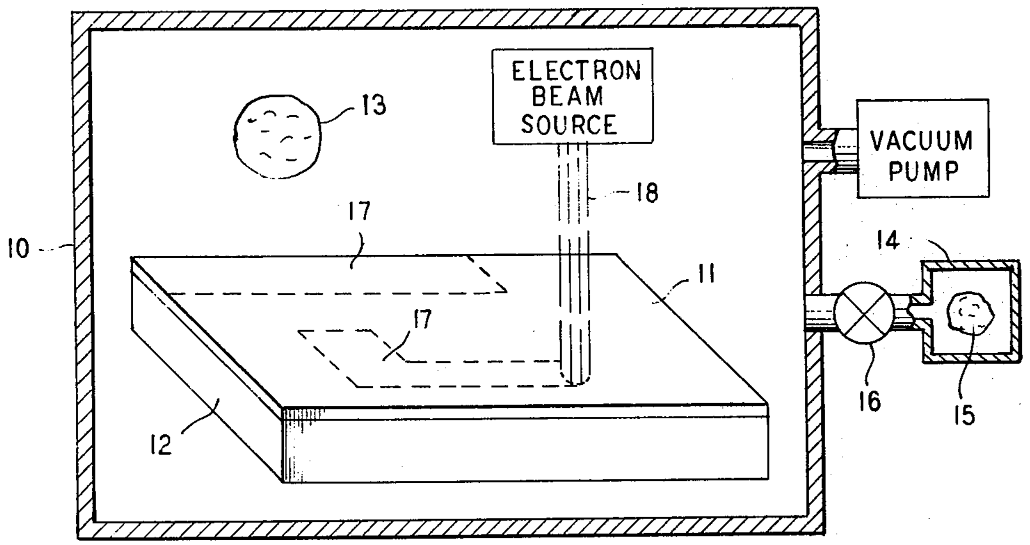
FIG. 1 is a partially schematic partially perspective view of an exemplary workpiece undergoing electron beam cross-linking.

Several techniques are available for the formation of a film 11 (See FIG. 1) of these substances on the surface of a substrate 12 in a form suitable for electron beam cross-linking. These substances can be introduced into a vacuum system 10 as is illustrated in FIG. 1 and adsorbed on the surface, or a polymer film can be deposited from solution or from the liquid phase on the surface. Any of the metal-cenes (ferrocene, nickelocene, etc) can be introduced as a vapor into a vacuum system and cross-linked by electron bombardment and any of the ferrocene-containing monomers can be similarly handled.

If the material used has an appropriate vapor pressure it can be introduced as a body 13 directly in the vacuum chamber 10. If the material vapor pressure is not suitable for direct inclusion in the vacuum chamber 10, or if it is otherwise desirable, the material can be fed into the vacuum chamber 10 in the vapor phase from an external source 14. The rate at which the material 15 is introduced into the chamber 10 can be controlled by controlling such parameters as the temperature of the material 15 and the size of the orifice of a connecting valve 16. Vinyl ferrocene, for instance, has a vapor pressure of approximately $10^{-5}$ torr at room temperature. Partial pressure of the film forming species within the range of $10^{-6}$ torr to $10^{-4}$ torr are suggested within a vacuum chamber for electron beam film forming usage in accordance with the invention. At pressure below this range film adsorption becomes uneconomically slow and above this range, the vapor increasingly interferes with the electron beam. When a vapor of these materials is introduced into the vacuum system, it is adsorbed onto the surface of such substrates of, for example, oxidic materials, metals or semiconductors.

The ferrocene monomers mentioned above are soluble in such organic solvents as benzene and chloroform. They can be polymerized in bulk by several methods well known in the art involving, for example, the use of free radical catalysts such as azobisisobutryonitrile, benzoyl peroxide and lauryl peroxide. Such work particularly related to vinyl ferrocene is reported in *Journal of Polymer Science*, 9, (1971) 651. These materials from soluble chain polymers, layers of which can be deposited from solution on the surface of a substrate to be treated, by the formation of a layer of the solution and evaporation of the solvent. Depending upon the polymer length, the cast film can be liquid or solid at the temperature at which the film is irradiated.

Electron Irradiation

Films of the above-mentioned materials are cross-linked by exposure to electrons in the energy range from 1000 to 20,000 electron volts. At electron energies below 1000 electron volts the maintenance of a well defined electron beam becomes difficult. Operation at electron energies above 20,000 electron volts is not recommended because of an unecononimally high reduction in the efficiency of the process. This is due, in part, to the reduction of the collision cross section with increase in voltage.

Electron beam voltage is, in part, determined by the desire to cross-link polymeric material at the substrate interface. This requires that the electrons have a sufficiently long penetration depth in the film. If the portion of the material at the interface is not cross-linked, it will be lifted by solvent action during development. Optimum conditions for cross-linking are based on the desire to produce gelation at the interface. A general equation for determining such voltage in terms of film thickness is set forth:

$$Z = 1.75\ (0.046/\rho) V_a, \qquad (1)$$

where $Z$ is film thickness in micrometers; $\rho$ is density (about 1.4 for the prototype polyvinyl ferrocene); $V_a$ is the accelerating voltage in kilovolts.

In general terms, the dosage required for ninety percent film retention is within the range of from about $8 \times 10^{-5}$ to $1.5 \times 10^{-4}$ coulombs per square centimeter. As is well known, higher required dosages correspond with higher beam voltages. Experimentally suitable results have been obtained by use of a 5 kV beam with a dosage of $8 \times 10^{-5}$ coulombs per square centimeter for a half micrometer thick film.

When working from the vapor phase the adsorbed film 11 is cross-linked where struck by the electron beam 18. Film buildup is produced by further adsorption and crosslinking by further bombardment of that area 17. Generally, partial pressures in the recommended range (from $10^{-4}$ torr to $10^{-6}$ torr) in conjunction with an electron flux of at least $10^{-9}$ amperes per square centimeters, will produce a film buildup of at least 30 Angstroms per minute.

Figure 2:
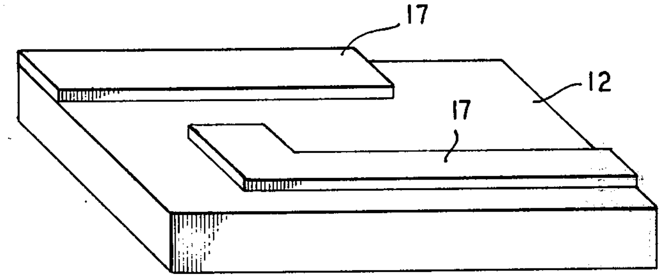
FIG. 2 is a perspective view of the workpiece of FIG. 1 in which the uncross-linked polymer has been removed leaving a patterned polymer film.

Polymer films containing ferrocene can be cast on a substrate by, for example, spinning a film of solution on the substrate and then evaporating the solvent. Layers of, typically, one micrometer thickness are cast in this fashion. The thickness of such films is dependent upon the concentration of the solution and the spinning conditions in a manner well known in the photolithographic art (*Handbook of Thin Film Technology*, Meissell and Glang, Mc Graw Hill Book Co. Inc., (1970) Chapter 7). Polymer layers so cast can be cross-linked to an extent sufficient for most resist usages by exposure to an electron flux of at least $10^{-5}$ coulombs per square centimeter. After cross-linking, the pattern 27 can be developed, as in FIG. 2, by dissolving the uncross-linked portion of the film.

Properties of the Cross-Linked Film

Figure 3:
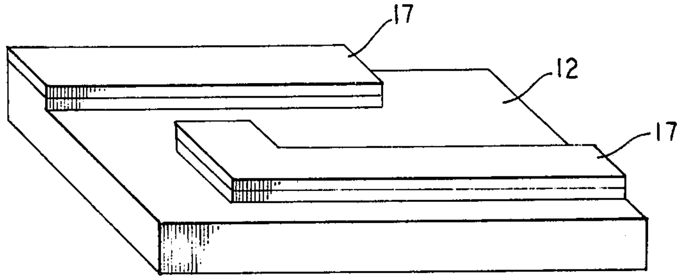
FIG. 3 is a perspective view of the workpiece of FIG. 2 with a patterned polymer film, in which substrate has been etched by exposure of the entire device to an etchant.

The film which is produced by the electron beam cross-linking reaction is insoluble in solvents such as acetone, chloroform, benzene and dioxane, and is highly resistant to acid and basic etchants commonly used in semiconductor processing such as buffered hydrofluoric acid, sodium ferricyanide-sodium hydroxide solution. The film is tenacious to oxidic materials, metals and semiconductors. For instance, a cross-linked film of vinyl ferrocene deposited on a $SiO_2$ substrate could not be stripped off by agitation in a standard warm chromic acid cleaning solution. The uncross-linked portion of the film 11 is readily removed by solution in solvents such as those mentioned above. Extremely small scale patterns 17 have been produced using this technique. Some exemplary patterns which have been produced are characterized by one micrometer wide strips separated by one micrometer wide spacings. These patterns can be used in this form for any of the etching or deposition masking techniques common in microcircuit technology. FIG. 3 illustrates the etching of that portion of the substrate 12 uprotected by the cross-linked film 17.

Figure 4:
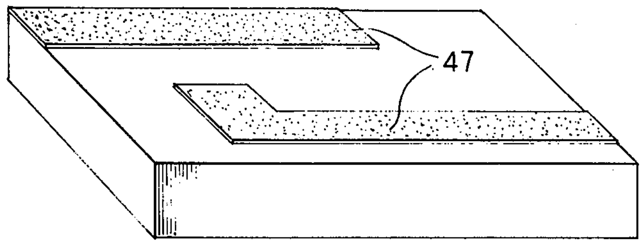
FIG. 4 is a perspective view of a workpiece with a patterned metallic residue left after driving off the hydrocarbon portion of the polymer film of FIG. 2.
Figure 5:
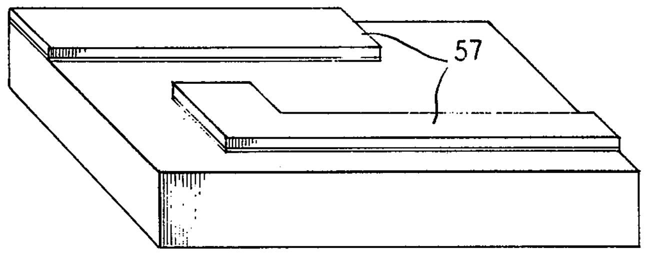
FIG. 5 is a perspective view of a substrate with a patterned metal film electrolessly deposited on the residue of FIG. 4.
Figure 6:
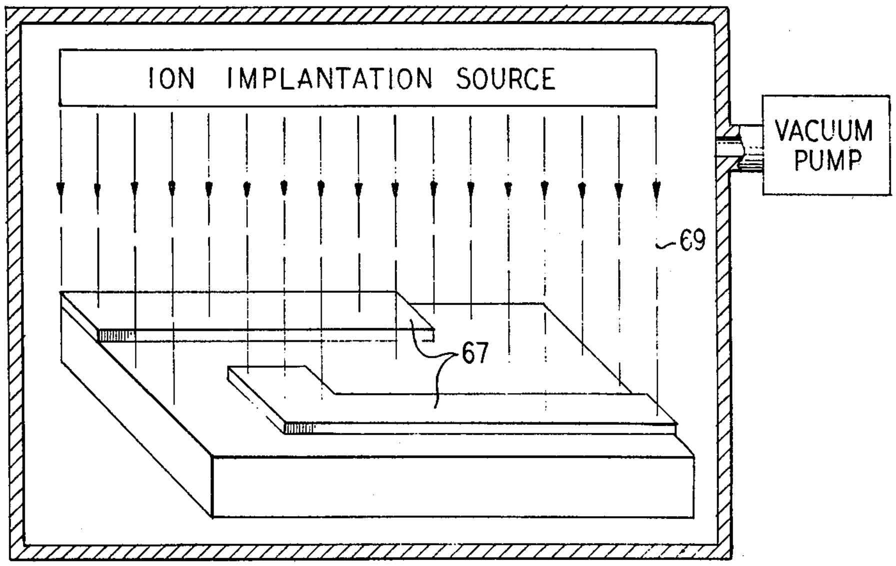
FIG. 6 is a partially schematic partially perspective view of a masked substrate of FIG. 2 undergoing ion implantation.

A use for which these materials are particularly suited is the direct production of metallic patterns by the electroless deposition of metal on the substrate surface. In order to produce electroless deposition of a desired pattern, electron beam cross-linking of the materials under consideration here is performed. After removal of the uncross-linked material, the organic portion of the patterned cross-linked film 27 is driven off leaving a metallic deposit 47 (FIG. 4) which is used to nucleate the electroless deposition of additional metal 57 (FIG. 5). The organic portion of the cross-linked film 27 can be driven off, for example, by a two step process involving exposure of the surface to an oxygen plasma and the subsequent reduction of the residual metal oxide by, for instance, heating in a hydrogen atmosphere. Patterned electroless deposition of copper, nickel and gold has been accomplished by this technique. Patterned films 27 containing as few as one metal atom for every 500 carbon atoms are effective in nucleating the deposition of additional metal 57 in this manner.

Patterned cross-linked films 67 of the materials under consideration here are also particularly suited for use as ion implantation masks. The high metallic content of these films 67 produces films of high density which are more highly absorbent of the implanting ion 69 beam that films of common polymeric masks. For example, films of ferrocene are nearly one and a half times as effective as non-iron-containing polymer films of the same thickness. Metal-containing hydrocarbon films with as little as one metal atom for every 50 carbon atoms possess significantly increased ion stopping power.

EXAMPLES

Patterned thin film layers have been formed on various substrate by the following procedures:

EXAMPLE 1

Vinyl ferrocene of 99.9 percent purity was polymerized by a procedure well known in the art (J. C. Lai, et al., *Journal of Polymer Science*, 9 (1971)651). A solution of 8 percent by weight poly(vinyl ferrocene) in benzene was spin-coated onto an oxidized silicon wafer. The wafer was dried and prebaked for 10 minutes at 60°C. The wafer was selectively exposed to an electron beam of particle energy $10^4$ volts with a total exposure of $5 \times 10^{-4}$ coulombs per square centimeter. The pattern was developed by a 15 second benzene spray treatment. The treatment. The resulting patterned film was insoluble and tenacious and suitable, for example, for etch and ion implantation mask use.

The above patterned film was used to generate a metal pattern by the following procedure:

The patterned polymer film was oxidized in an oxygen plasma. The plasma was induction coupled in a chamber at a pressure of $10^{-2}$ torr. Exposure of the wafer for ten minutes was sufficient to oxidize the approximately 2000 Angstrom thick film. The residual iron oxide was reduced to metallic iron by treatment with potassium borohydride ($KBH_4$) by immersion for 10 seconds in a 5 percent aqueous solution.

The wafer was then dipped into an electroless gold plating solution and a gold plating of at least 0.1 micrometer thickness was formed. Similarly processed wafers were electrolessly plated with copper and with nickel.

EXAMPLE 2

Approximately 0.1 grams of vinyl ferrocene were placed, together with an oxidized silicon wafer, in a vacuum chamber which was evacuated to approximately $10^{-5}$ torr. The wafer was selectively irradiated with an electron beam of $10^4$ electron volts beam energy and $10^{-10}$ amperes raster scanned over a 1 millimeter square area for 3 minutes such that the exposure was essentially uniform over the area. The wafer was removed from the vacuum chamber and was observed to have a 1 millimeter square polymer film approximately 400 Angstroms thick which was insoluble in benzene. The wafer was treated with an oxygen plasma and with potassium borohydride as in Example 1. The resulting pattern was used to nucleate the electroless deposition of copper.

EXAMPLE 3

The procedure of Example 2 was followed using approximately 0.1 grams of ferrocene, the duration of irradiation being approximately 3 minutes.

EXAMPLE 4

The procedure of Example 2 was followed using approximately 0.1 grams of nickelocene, the duration of irradiation being approximately 3 minutes. In this case the polymer film was approximately 100 Angstroms thick.

EXAMPLE 5

In order to form poly(diphenyl ferrocene), 0.3 grams of vinyl diphenyl ferrocene was dissolved in 3 ml of benzene together with 0.03 grams of benzoyl peroxide. The solution was placed in a glass tube which was then sealed and brought to 75°C. The tube was held at that temperature for 48 hours. The contents of the tube were then stirred into a large quantity of hexane, which caused the polymer to precipitate. The precipitate was filtered yielding more than 0.1 grams of poly(diphenyl ferrocene). The polymer was dissolved in benzene and spin-coated on an oxidized silicon wafer as in Example 1.

EXAMPLE 6

Allyl ferrocene was polymerized and used to form a patterned polymer film as in Example 5.

EXAMPLE 7

A solution of 10 percent polyvinyl ferrocene of molecular weight 80,000 Mv (molecular weight as determined by viscosity measurement) in benzene is applied to a polished fused silica substrate of dimensions 1 inch diameter by ⅛ inch by spinning the substrate about its own axis at 4,000 r.p.m. The resulting liquid layer is of the approximate thickness of 4,000 Angstroms.

What is claimed is:

1. A method of product fabrication comprising the formation of a patterned layer of matter upon a substrate and, optionally, further processing steps, which said formation includes directing a beam of electrons against a selected portion of a layer of an organometallic di-$\pi$-cyclopentadienyl compound on a substrate thereby cross-linking the compound of the selected portion, wherein the compound contains di-$\pi$-cyclopentadienyl M in a relative concentration such that at least one atom of M is present in the layer for every 500 carbon atoms, where M is at least one member selected from the group consisting of Fe, Ni, Co, V, Cr, and Ti.

2. A method of claim 1 in which the compound contains di-$\pi$-cyclopentadienyl iron as a substituent in a soluble polymer.

3. A method of claim 2 in which the compound is poly(vinyl di-$\pi$-cyclopentadienyl iron).

4. A method of claim 2 in which the superposed layer is deposited from a solution.

5. A method of claim 4 in which the solution contains at least one member of the group consisting of benzene and chloroform.

6. A method of claim 1 in which the layer of the compound is deposited from a vapor.

7. A product fabricated by the method of claim 1.

* * * * *

UNITED STATES PATENT AND TRADEMARK OFFICE

CERTIFICATE OF CORRECTION

PATENT NO. : 3,885,076

DATED : May 20, 1975

INVENTOR(S) : Robert Darrow Heidenreich and Larry Flack Thompson

It is certified that error appears in the above-identified patent and that said Letters Patent are hereby corrected as shown below:

Column 1, line 44, "absorbed" should be --adsorbed--.

Column 3, line 20, "from" should be --form--.

Column 4, line 43, "uprotected" should be --unprotected--.

Column 5, line 26, delete "The treatment.".

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*